(12) United States Patent
Greciet et al.

(10) Patent No.: US 8,499,626 B2
(45) Date of Patent: Aug. 6, 2013

(54) DEVICE TO ADJUST THE PITCH ANGLE OF PROPELLER BLADES FOR A MODEL ENGINE

(75) Inventors: Romuald Greciet, Tournefeuille (FR); Jean-Marc Mercier, Tournefeuille (FR)

(73) Assignee: Airbus Operations (S.A.S), Toulouse (FR)

( * ) Notice: Subject to any disclaimer, the term of this patent is extended or adjusted under 35 U.S.C. 154(b) by 597 days.

(21) Appl. No.: 12/781,460

(22) Filed: May 17, 2010

(65) Prior Publication Data

US 2010/0290909 A1 Nov. 18, 2010

(30) Foreign Application Priority Data

May 18, 2009 (FR) ..................................... 09 53300

(51) Int. Cl.
*G01M 9/00* (2006.01)
(52) U.S. Cl.
USPC .......................................................... 73/147
(58) Field of Classification Search
None
See application file for complete search history.

(56) References Cited

U.S. PATENT DOCUMENTS

| | | | |
|---|---|---|---|
| 1,736,247 A | 11/1929 | Bodenlos | |
| 4,411,073 A | 10/1983 | Ryan | |
| 4,422,757 A | 12/1983 | Munski | |
| 2005/0226727 A1* | 10/2005 | Dennis et al. | 416/98 |
| 2007/0041837 A1* | 2/2007 | Ide et al. | 416/147 |
| 2009/0212565 A1* | 8/2009 | Kabatzke et al. | 290/44 |
| 2010/0290909 A1* | 11/2010 | Greciet et al. | 416/153 |
| 2011/0229300 A1* | 9/2011 | Kanev et al. | 415/1 |
| 2012/0282091 A1* | 11/2012 | Esbensen et al. | 416/1 |

OTHER PUBLICATIONS

French Search Report and Written Opinion dated Dec. 16, 2009.

* cited by examiner

*Primary Examiner* — Andre Allen
(74) *Attorney, Agent, or Firm* — Jenkins, Wilson, Taylor & Hunt, P.A.

(57) ABSTRACT

A device for adjusting the pitch angle of propeller blades for a model engine including at least one rotor, the blades extending radially on the surface of the rotor to form a propeller. It includes a tool-holder including a base designed to be fixed to a part of the outside of the engine housing and an upper part, the aforementioned upper part being fitted with means of support movable horizontally along a longitudinal axis (XX'), the aforementioned axis being parallel to the main axis of the model engine, contactless means of optical measurement, the aforementioned means of measurement being mounted on the movable means of support by using means of travel in rotation around an axis of rotation, the aforementioned axis of rotation being the blade's axis of rotation.

9 Claims, 3 Drawing Sheets

DEVICE TO ADJUST THE PITCH ANGLE OF PROPELLER BLADES FOR A MODEL ENGINE

CROSS-REFERENCE TO RELATED APPLICATIONS

This application claims priority to and the benefit of French Application No. 09 53300 filed on 18 May 2009, the disclosures of which are incorporated by reference in its entirety.

This aspects of the disclosed embodiments relate to a device to adjust the pitch angle of propeller blades for a model engine designed for aerodynamic tests in a wind-tunnel.

BACKGROUND

It is known to place a model of a plane in an aeronautical wind-tunnel that creates conditions similar to those of real flight, in order to study the aerodynamic properties of the airplane. In particular, the model allows the interaction between the flow produced by the fan and its ancillary exterior and interior equipment around the turbine and the propeller, in the case of an airplane fitted with a gas turbine engine, to be studied.

In known manner, real engines comprise a gas generator comprising a compressor to compress the air circulating towards the rear of the engine, a combustion chamber in which fuel is mixed with the compressed air and ignited so as to form a high-energy gas current, and a turbine driven by the gas current and mounted so as to drive a rotor that in turn controls the compressor. These engines also comprise a second turbine, located at the rear of the gas generator, which extracts energy from the gas current to drive a rotating load with propeller blades to generate thrust.

The blades are variable-pitch blades to achieve optimum results. Thus, during the flight, engine fuel efficiency can be increased by changing the pitch of the blades to match specific operational conditions. The pitch corresponds to the travel of a given straight section along the propeller's axis of rotation for one turn of the propeller. By straight section of the blade is meant a blade section plane normal to the blade axis at a distance R from the propeller's axis of rotation. This pitch depends on the pitch angle corresponding to the angle between the chord of the blade profile for the section in question and the propeller's rotation plane. By convention, the pitch and pitch angle are given for a straight section located at 75% of R, where R is the radius of the propeller.

In general, the turbine is fitted with various blade orientation control mechanisms such as ordinary actuators installed in the inside space available at the center of the turbine. Mechanical links transmit the movement of the actuator rod radially to the blades.

In the case of a model, it is obviously impossible, in practice, to couple the model's propeller blades with blade orientation control mechanisms such as they exist in real engines. Thus the simulation is carried out with a constant blade pitch angle. To simulate the flow around the turbine and the blades depending on the blade pitch angle, a series of aerodynamic simulation sessions of the model plane is carried out with varying blade pitch angle values. It is customary therefore to change the propeller blade pitch angle manually between two simulation sessions.

For this, current propeller blade pitch systems comprise a laser-sensor based angle measurement means and a pitch template. These laser-sensor based angle measurement means allow the distances between the sensor linked to a fixed measurement reference and a spot on the propeller blade profile to measured, so as to measure the value of the blade pitch angle without coming into contact with the blade. In this manner, this technique of contactless measurement makes it possible to not apply forces that could modify the blade's position.

The operation of such a pitching system is described above and illustrated in FIGS. 1A to 1D. In an initial configuration (FIG. 1A), propeller blades 5 are pitched according to a value $\beta 1$ on the model. To change the pitch angle, i.e. change value $\beta 1$ to another value $\beta 2$, the propeller is removed. Then blade template 13 is installed, serving as reference pitch. This template is composed of blade stumps oriented in accordance with the selected test pitch $\beta 2$. Distances d1 and d2 between sensor 11 and a spot obtained on the blade pitch template are measured. When distances d1 and d2 are obtained, the blades of the removed propeller are set based on distances d1 and d2 measured in the preceding step and the propeller is remounted with the blades set according to $\beta 2$.

Such a pitching system is however not very satisfactory from a practical point of view. Effectively, the model is especially fragile and in particular the propeller blades, which are barely 1 mm thick. Thus, while adjusting the pitch angle, with the known system, there is significant risk of damaging the blades. Further, such a pitch adjustment system represents a difficult and time-consuming task.

These difficulties in adjusting the blades are increased in the context of a counter-rotating propeller in which the two coaxial rotors turn at opposite speeds and in opposite directions. FIG. 2 shows an example of a real turbopropeller 2 comprising two counter-rotating rotors 3, 4.

SUMMARY

In the context of designing a new type of pitching system for a model fitted with counter-rotating propellers, the new pitching system must fulfill the following technical requirements:

the angle measurements must be carried out without contact the precision of blade pitching: $\pm 0.05°$ the pitch adjustment range lies between $-20°$ and $+90°$ implementing the pitching system must be possible without disassembling the two rotors, as the disassembly and reassembly of the two rotors can damage the measurement instruments housed inside the stumps.

The purpose of the disclosed embodiments is therefore to propose a new device for adjusting pitch that must be simple to implement, allowing the risk of damaging the blades to be reduced while fulfilling the requirements stated above.

To this end, the disclosed embodiments relate to a device for adjusting the pitch angle of propeller blades for a model engine comprising at least one rotor, the blades extending radially on the rotor's surface to form a propeller.

According to the disclosed embodiments, it comprises:
  a tool-holder comprising a base designed to be fixed to a part of the outside of the engine cover, and an upper part;
  said upper part being fitted with support means moving horizontally along a longitudinal axis (XX'), said axis being parallel to the engine's main axis,
  contactless means of optical measurement of the pitch angle of a blade,
  said measurement means being mounted on the movable means of support using means of rotational travel around an axis of rotation, said axis of rotation being the blade's axis of rotation.

Thus, in this manner, it is no longer necessary to disassemble the rotor on which the propeller is mounted between two tests. The operator installs the pitch angle adjustment device directly onto the model, close to the rotor. The means of horizontal travel and the means of rotational travel allow the position of the means of measurement to be adjusted in relation to the blade.

According to a form of embodiment of the disclosed embodiments, the means of measurement are linked to a measurement circuit allowing the distances between the laser sensor and the laser spot on the blade surface to be measured.

Preferably, these pitch angle measurement means comprise at least two laser sensors.

According to a form of embodiment of the disclosed embodiments, the laser sensors are mounted on the end of a vertical arm, the opposite end of said arm being linked to the means of rotational travel, the laser sensors being installed on said arm such that they are facing a surface area of the blade.

According to a form of embodiment of the disclosed embodiments, the movable means of horizontal travel comprise at least one guide track fixed to the upper part assembly and one guide roller designed to fit in the guide track and to travel in the guide track.

According to a form of embodiment of the disclosed embodiments, the means of rotational travel comprise a rotary arm driven by a stepping motor and a worm screw.

Advantageously, the horizontally movable means of support and the rotational travel means are controlled independently or simultaneously by a control unit.

According to a form of embodiment of the disclosed embodiments, the engine comprising two counter-rotating rotors and a set of blades extending radially on the surface of each of the two rotors, the laser sensors are installed on two vertical arms installed on either side of the two sets of blades.

Advantageously, the measurement circuit comprises a computer designed to determine the value of the blade pitch angle from the measured distances.

BRIEF DESCRIPTION OF THE DRAWINGS

The disclosed embodiments will be better understood after reading the following description and examination of the associated figures. These are provided for information purposes and are in no way limitative with respect to the disclosed embodiments. The figures show.

DETAILED DESCRIPTION

Figure 1:
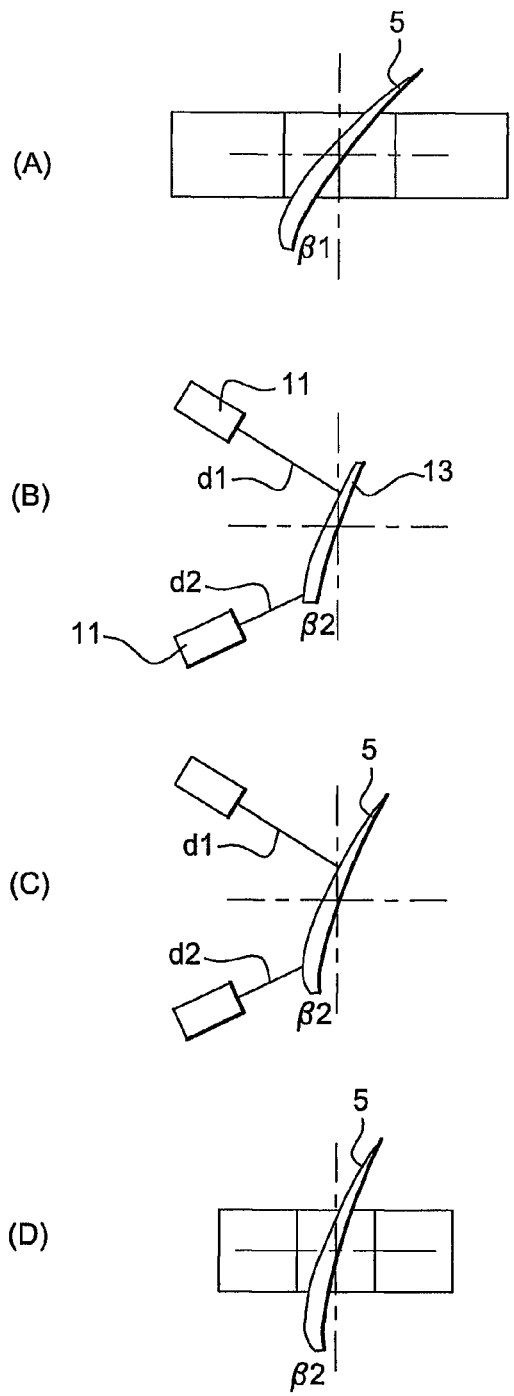
FIGS. 1A to 1D: a schematic representation of the four steps of adjusting the pitch angle of a propeller blade with a pitching system according to the prior state of the art.
Figure 2:
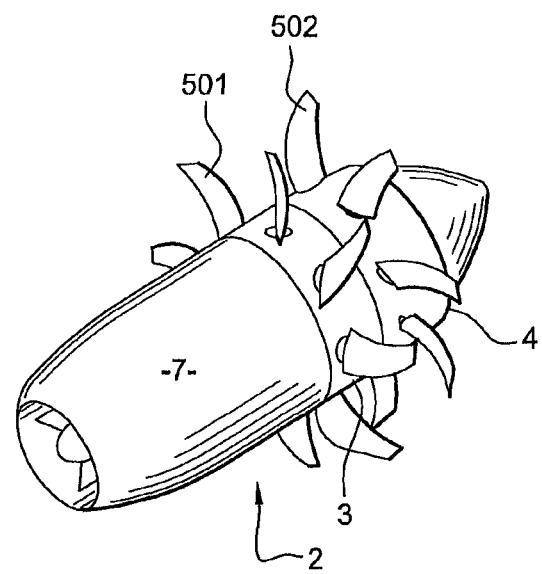
FIG. 2: a schematic representation of a turbopropeller comprising two counter-rotating rotors.

FIG. 2 is a schematic of a known real jet engine 2 with an unducted fan. This engine comprises forward and rear propeller blades 501, 502 turning in opposite directions. The blades are installed radially outside nacelle 7 on a power turbine. The power turbine comprises two rotors 3, 4 turning in opposite directions. Forward and rear blades 501, 502 are coupled respectively to first and second rotors 3, 4 and turn with them.

Figure 3:
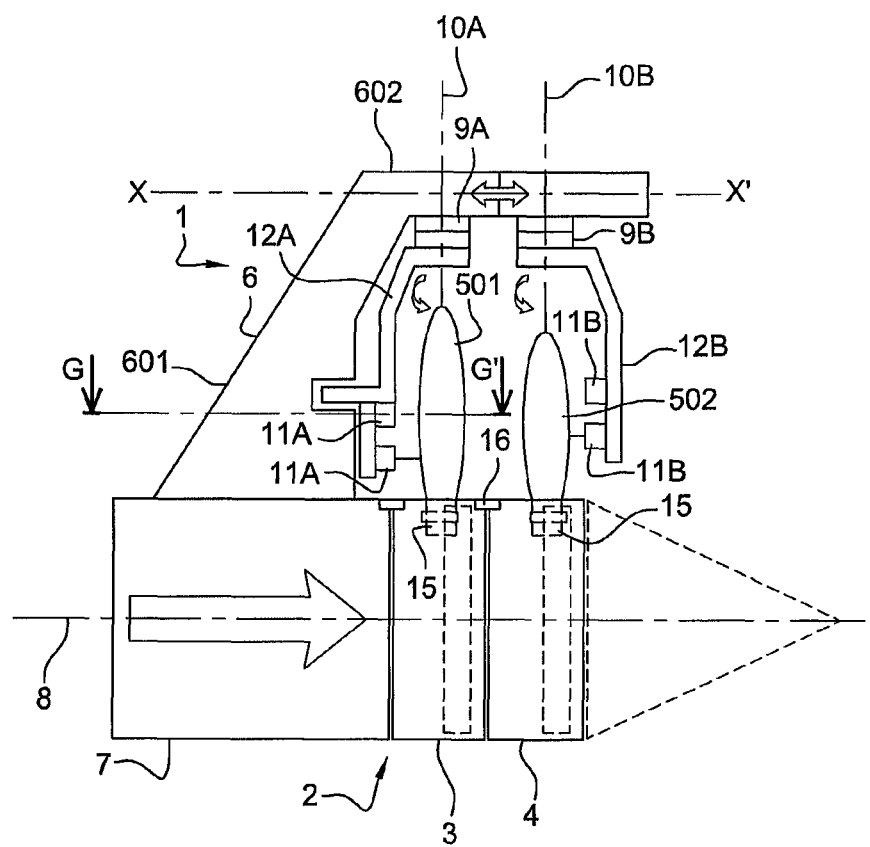
FIG. 3: a schematic representation of a side view of the pitch angle adjustment device according to the disclosed embodiments.
Figure 4:
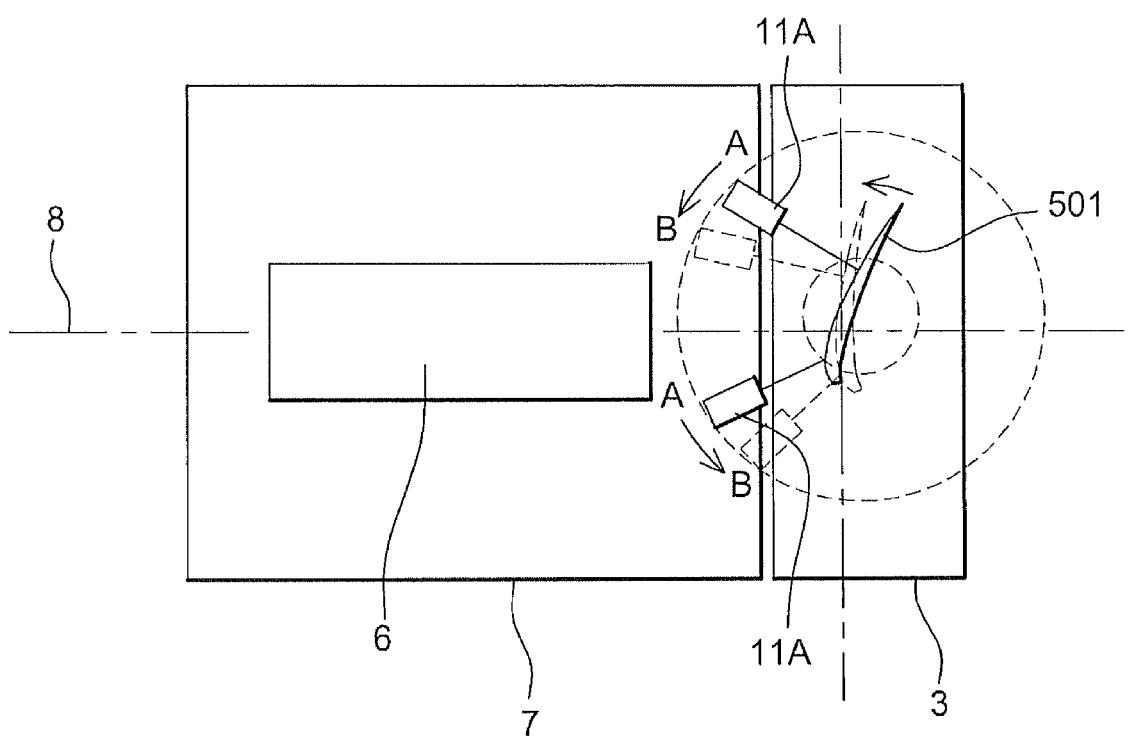
FIG. 4: a schematic representation of a top view of the device in FIG. 3.

The device schematized in FIGS. 3 and 4 is designed to adjust the propeller blade pitch angle of an engine 2 similar to that described above but as a wind-tunnel model. For clarity, FIGS. 3 and 4 show the model engine with only one blade per propeller. Furthermore, we have retained the same numeric reference numbers for elements that are common to both the real engine and the model. To fasten the blades that extend radially from the surface of the rotors 3, 4, the blades comprise a lower part with a shape designed to fit inside recesses installed on the rotors' surface and fixed by fixing means 15. Rotor elements 3, 4 are also linked together with suitable fixing means 16.

Adjustment device 1 comprises a tool-holder 6 that comprises a base 601 and an upper part 602 cantilevered in relation to the base. Upper part 602 carries two pairs of laser sensors 11A, 11B fixed on arms 12A, 12B. The base and upper part are configured such that when base 601 is fixed on the surface of nacelle 7, upper part 602 that carries the sensors comes into position above the forward and rear propeller blades 501, 502.

FIGS. 3 and 4 show a form of embodiment of the disclosed embodiments wherein the adjustment device is tailored for a model comprising two forward and rear propellers 501, 502. Tool-holder 6 comprises two arms to carry the sensors that come into position on either side of the forward and rear propeller blades 501, 502. The sensors are installed on the arms such that they are pointing towards an area on the blade surface. Generally, it is possible to mount two sensors for each arm, to adjust the pitch angle of one blade.

These laser sensors 11A, 11B comprise in known manner a transmitter element and a receiver element mounted in a housing. The housing is fixed onto the arm structure. These laser sensors allow high-precision measurements to be taken without contact with the blade, allowing a high level of precision of ±0.05° to be reached. The blade pitch angle can be deduced from the distances measured between the sensors and a spot on the blade, using a formula that depends on these distances. By pitch angle is meant the pitch angle for a given straight section of the blade. Conversely, if we want to adjust the blade to a predetermined pitch angle, the position of the blade must be adjusted such that the distances between the sensors and the target spots of the propeller correspond to this pitch angle.

The distance measurements can be visualized by using a measurement circuit that receives the signals coming from the sensors. This measurement circuit can be linked to a computer that allows the value of the pitch angle corresponding to the distances measured to be provided directly via a display. The measurement circuit and display are not shown in FIG. 3.

The application of the device of the disclosed embodiments shown in FIGS. 3 and 4 relates to an engine with two rotors. This device, however, also applies to the case of an engine with a single rotating rotor.

To avoid disassembling the rotors between two wind-tunnel tests, the device of the disclosed embodiments has directly integrated means of horizontal travel and of rotational travel that allow the positions of the sensors to be adjusted in relation to the blade. For each rotor in the engine, a sensor support arm is provided. In FIG. 3, an arm labeled 12A for the rotor comprising the forward propeller and an arm labeled 12B for the rotor comprising the rear propeller are provided.

Arms 12A, 12B have an inverted L shape so as to partially surround the blade on either side of the two rotors 3, 4. One end of the arms carries the sensors and the opposite end is fixed to an arm 9A, 9B rotating around an axis of rotation 10A, 10B. This rotating arm 9A, 9B is driven by a stepping motor and a worm screw for instance. The axis of rotation is also the blade's axis of rotation. The degree of angular precision is 0.002°.

To adjust the sensors in relation to the blade along a horizontal axis XX' that is parallel to the engine's main axis 8, the rotating arm on which the ends of the arms are fixed is itself fixed onto an assembly element able to travel along axis XX'. This assembly is an assembly of upper part 602 of the tool-holder. To allow the assembly element to be moved, one or two guide tracks are provided, for instance, in which a guide roller travels. The guide roller is driven in the guide track by an electric motor housed in tool-holder assembly 6 for instance.

The means of rotational travel around axis of rotation 10A, 10B and the means of horizontal travel along axis XX' of the arm can be controlled simultaneously or independently by a control unit.

The process for implementing the adjustment device comprises the following steps. Firstly, the adjustment device is fixed on the surface of the nacelle by known fixing means. Indicators for placing the device may be positioned on the nacelle surface. Even though the arms and sensors come into position facing the blade automatically, it is necessary to adjust the distances between the sensors and the rotor planes by travelling along axis XX'. When the blade for which it is planned to adjust the pitch angle is positioned facing the laser sensors, the foot of the blade fixed in the rotor is unlocked so as to allow its position to be adjusted according to the measurements supplied by the laser sensors. In FIG. 4, which is a top view of the device along cut GG' of FIG. 3, for reasons of clarity only blade 501 of the forward propeller is shown as well as the related sensors 11A. The laser sensors' angular position is adjusted by moving rotational arm 9, the sensors are moved around axis of rotation 10A from a start position labeled A towards a new position labeled B in which the outline of the sensors is shown by dashes, this new position of the sensors corresponding to the new blade pitch position. Correspondingly, the blade is then moved from a start position in which it is black to a new position in which the outline of the blade is shown in dashes, this movement being carried out according to measurements supplied by the sensors.

As shown in FIGS. 3 and 4, the pitch angle adjustment device is fitted directly onto the nacelle of engine 2, in a place adjoining the blades, the motorized means of travel of the sensors via the arms confers high maneuverability as there is no need to disassemble the rotors to carry out the adjustment of the propeller blades' pitch angle. Thus the time and/or costs of carrying out the tests are minimized while ensuring a high level of reliability in the measurements.

The invention claimed is:

1. Device for adjusting the pitch angle of propeller blades for a model engine comprising at least one rotor, the blades extending radially on the surface of the rotor to form a propeller, the device comprising:

a tool-holder comprising a base designed to be fixed onto a part of the outside of the engine housing and an upper part, a support connected to said upper part using structure for rotational travel around an axis of rotation, said support being movable horizontally along a longitudinal axis (XX'), said longitudinal axis being parallel to a main axis of the model engine, and a contactless optical measurement sensor mounted on the movable support, wherein said support is movable to a position in which said axis of rotation is substantially aligned with an axis of rotation of a blade with respect to a rotor of the propeller; and wherein said measurement sensor is configured to measure a distance between the measurement sensor and the blade.

2. Device according to claim 1, wherein the measurement sensor comprises at least two laser sensors.

3. Device according to claim 2, wherein the measurement sensor is linked to a measurement circuit allowing the distances between the laser sensor and the laser sport on the blade surface to be measured.

4. Device according to claim 3, wherein the laser sensors are mounted on the end of a vertical arm, the opposite end of said arm being linked to the structure for rotational travel, the laser sensors being installed on said arm such that they are facing an area on the surface of the blade.

5. Device according to claim 1, wherein the horizontally movable support comprises at least one guide track fixed to the upper part assembly and at least one guide roller designed to go into the track and to travel within the guide track.

6. Device according to claim 1, wherein the structure for rotational travel comprises a rotating arm driven by a stepping motor and a worm screw.

7. Device according to claim 5, wherein the horizontally movable support and the structure for rotational travel are controlled in independent or simultaneous manner by a control unit.

8. Device according to claim 1, wherein the engine comprises two counter-rotating rotors and a set of blades extending radially on the surface of each of the two rotors, the laser sensors being installed on two vertical arms set on either side of the two sets of blades.

9. Device according to claim 2, wherein the measurement circuit comprises a computer designed to determine the value of the blade pitch angle from the distances measured by the laser sensors.

\* \* \* \* \*